United States Patent Office 2,867,315
Patented Jan. 6, 1959

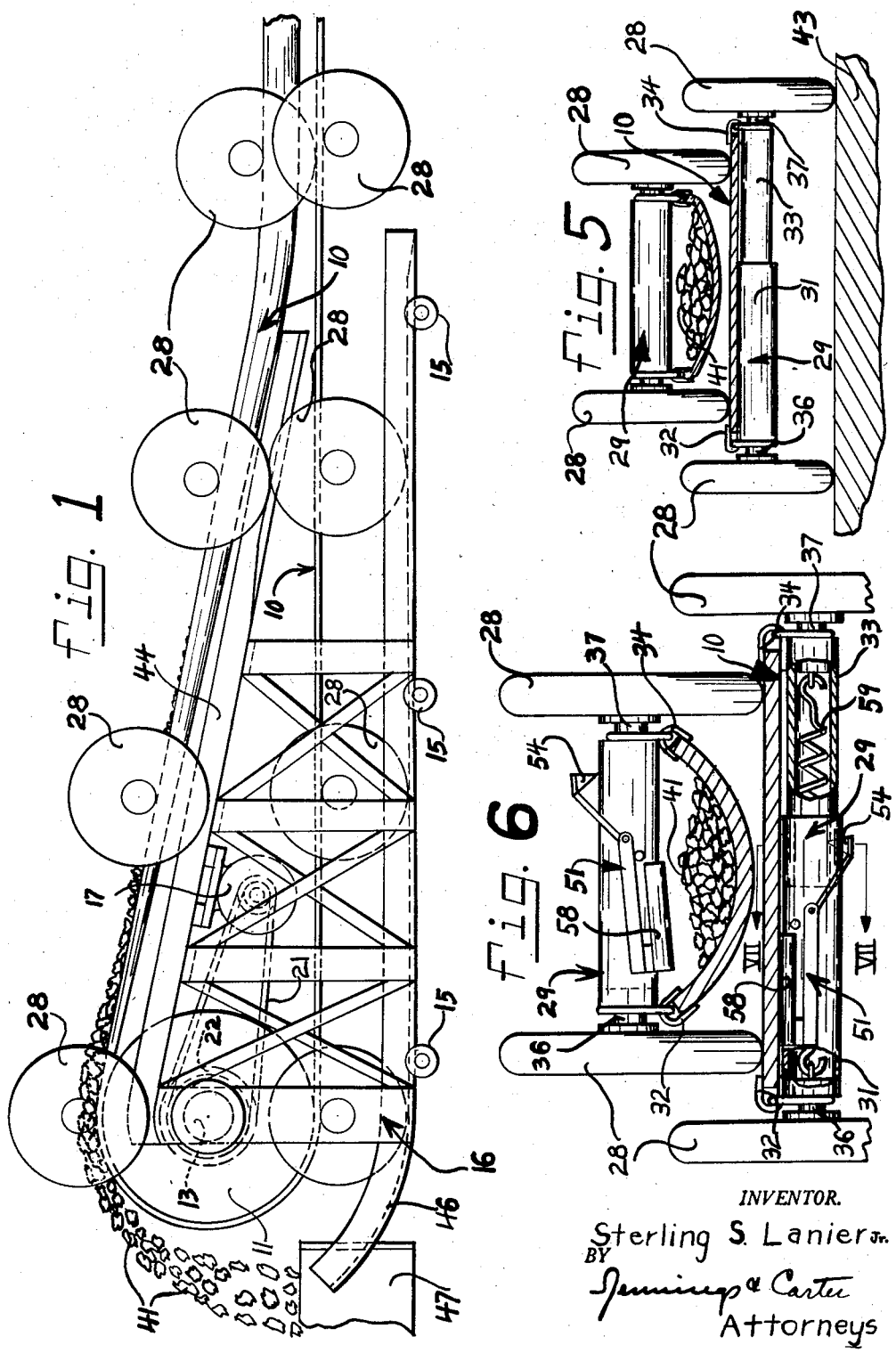

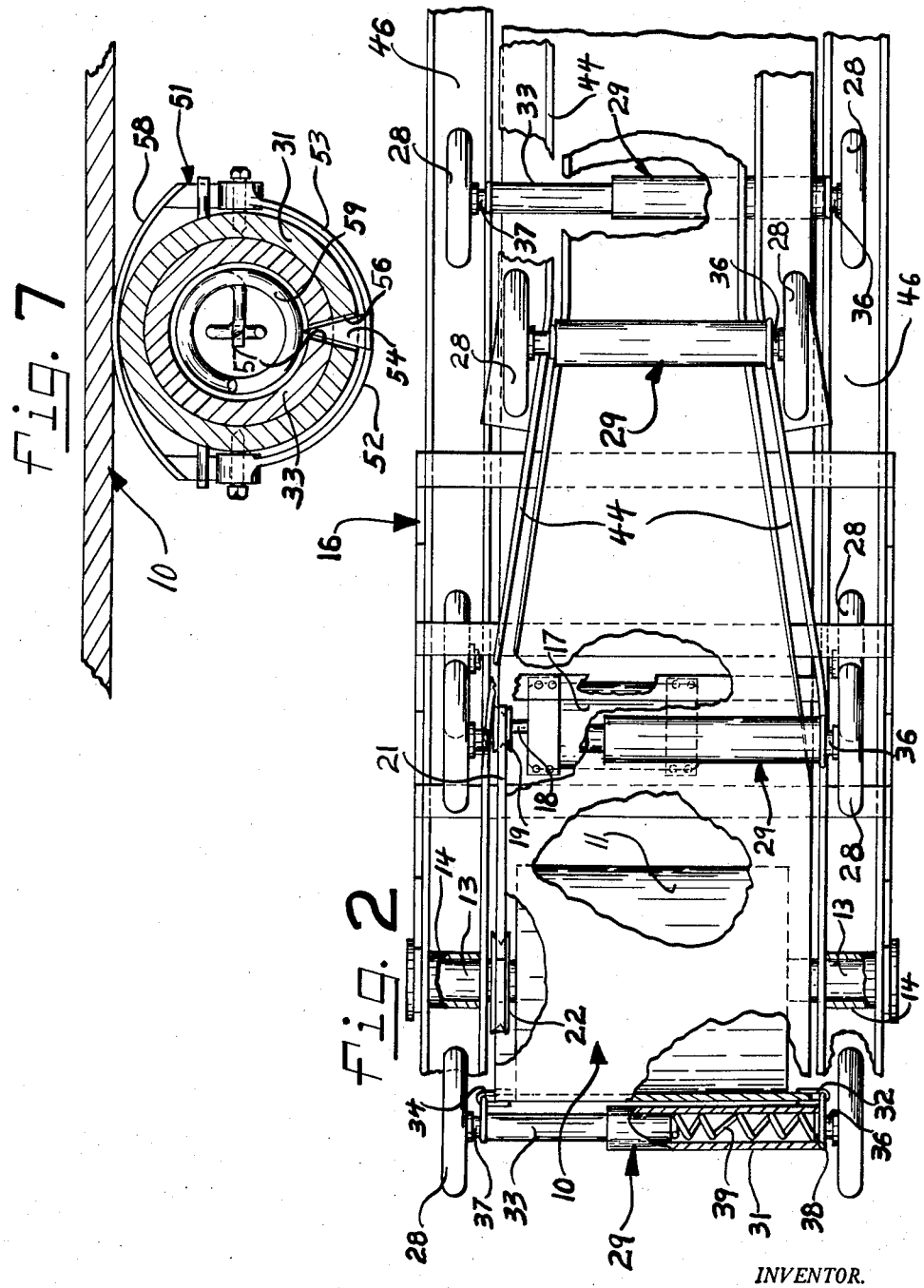

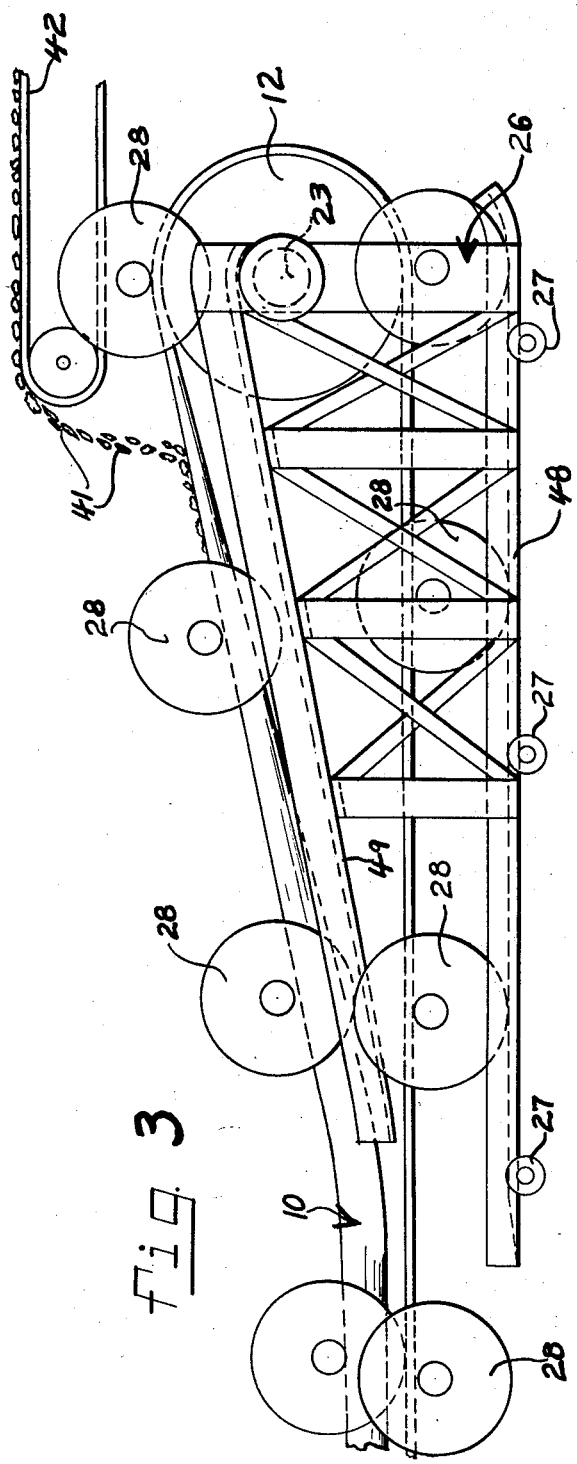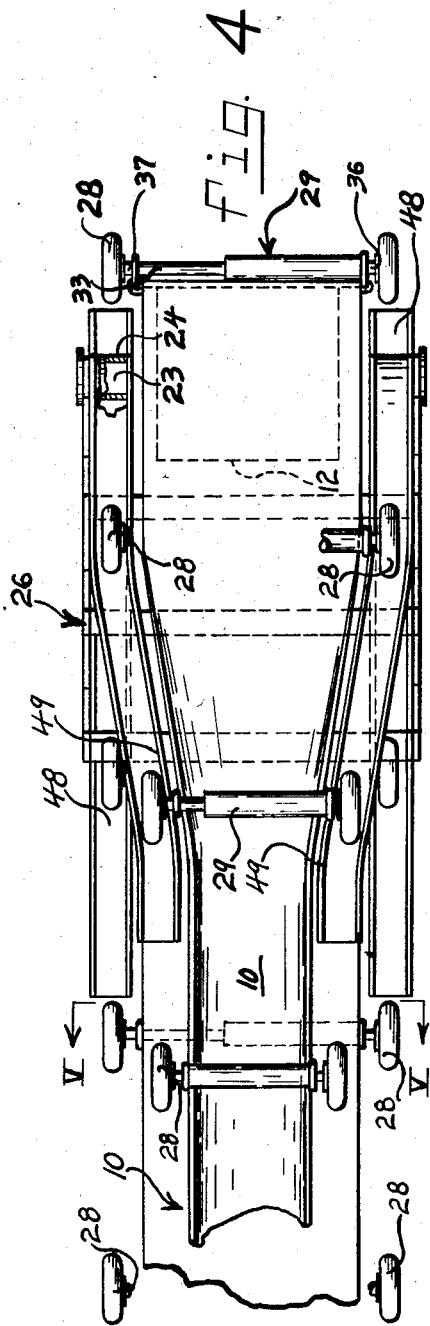

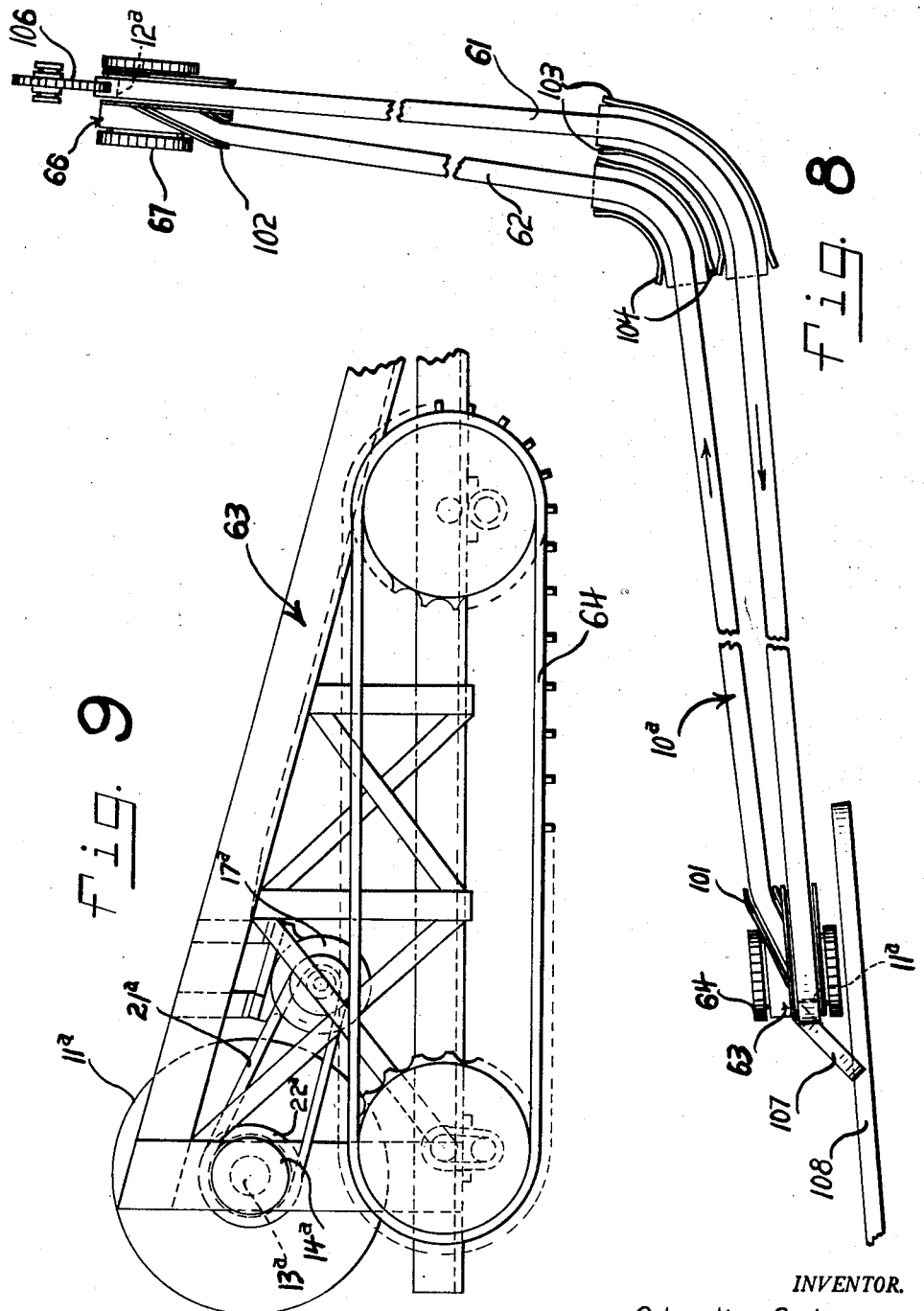

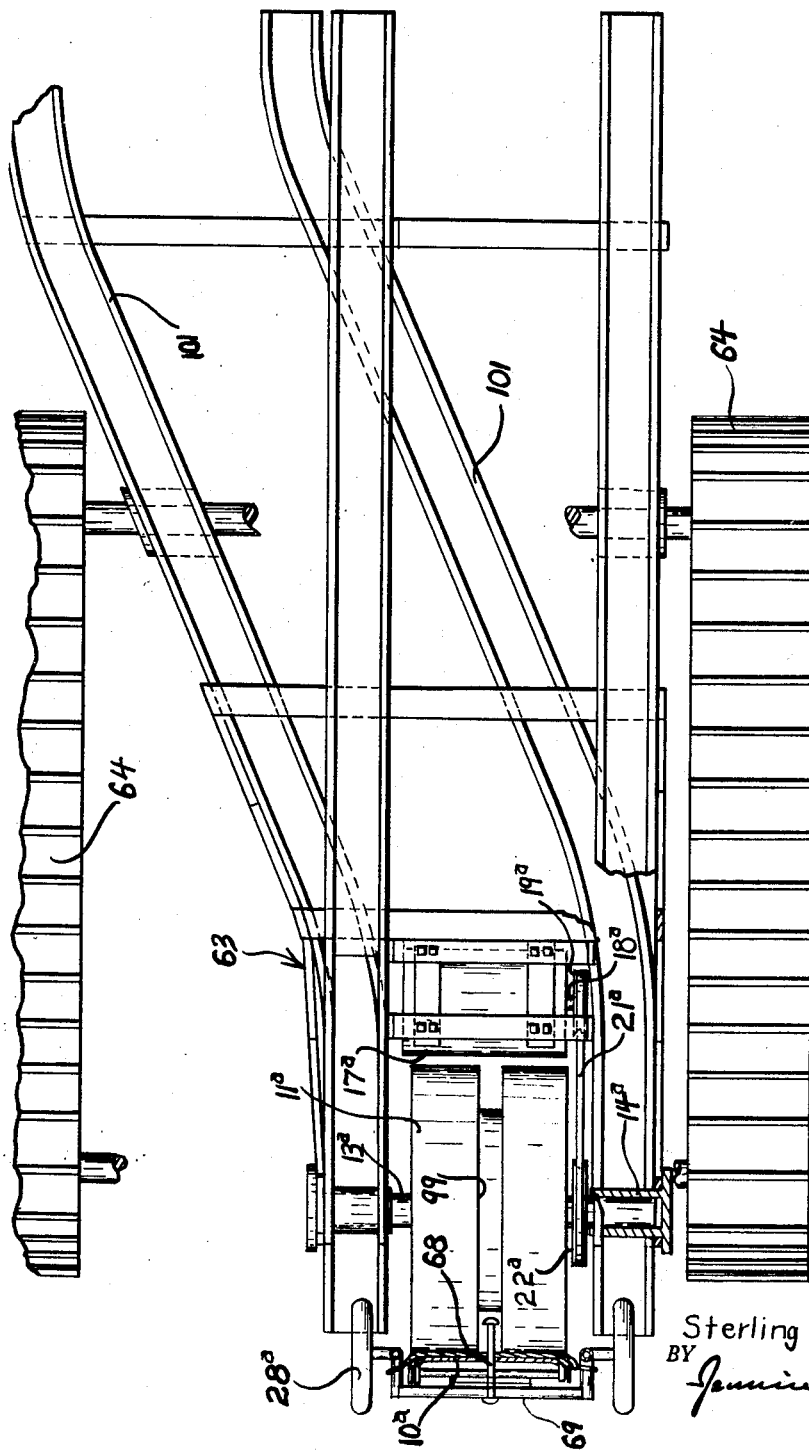

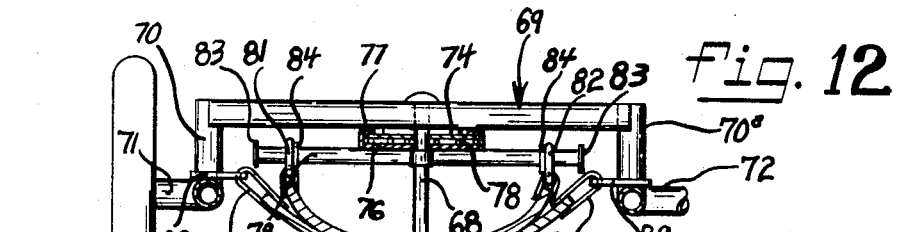
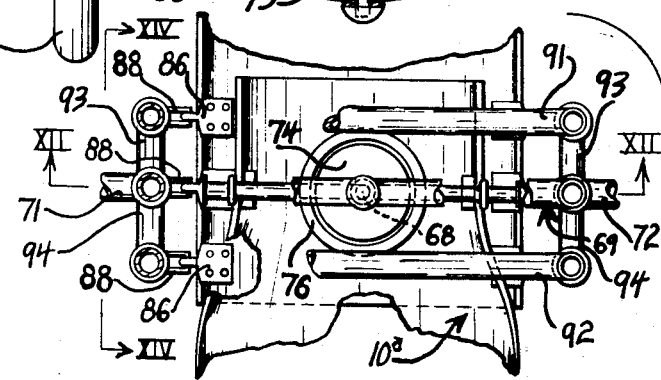
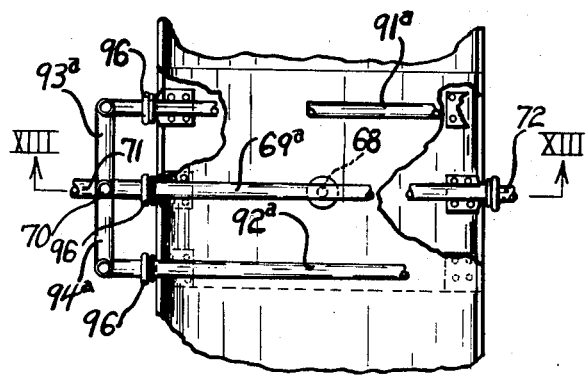
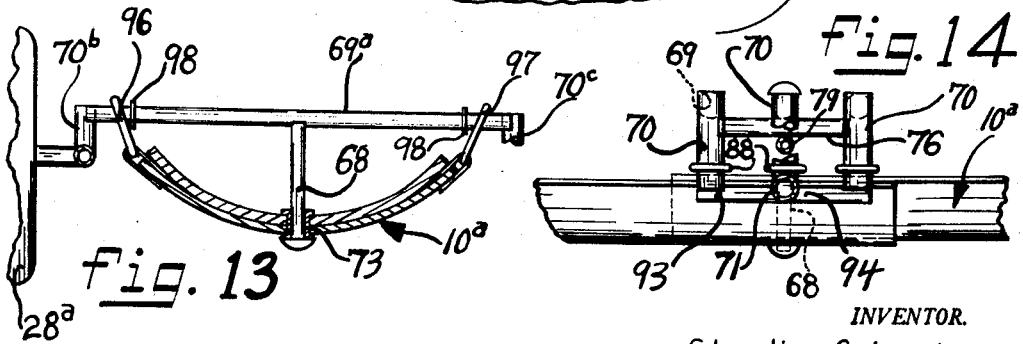

2,867,315

CONVEYING APPARATUS

Sterling S. Lanier, Jr., Nortonville, Ky., assignor of small percentages to various assignees Application December 7, 1955, Serial No. 551,651

5 Claims. (Cl. 198—201)

This invention relates to conveying apparatus and has for an object the provision of self supporting means for an endless conveyor belt whereby troughing idlers and return rolls are eliminated entirely.

Another object of my invention is to provide conveying apparatus of the character designated in which the length of the conveying section thereof may be increased or decreased without the addition of or removal of idler supports.

Another object of my invention is to provide conveying apparatus which is adapted to convey around curves as well as along straight lines.

A further object of my invention is to provide conveying apparatus which requires a minimum of space for the operation thereof.

A still further object of my invention is to provide conveying apparatus of the character designated which shall be simple of construction, economical of manufacture, and which can be installed in a minimum of time and with a minimum of effort.

Heretofore in the art to which my invention relates, various forms of conveying apparatus have been devised. However, such apparatus with which I am familiar has been expensive to manufacture and install, particularly in places where there is a limited amount of space for installation, such as in coal mines and the like. This is due primarily to the fact that the flights of such conveyors have heretofore been supported by idler supports and rolls mounted on heavy intermediate structures which must be mounted within the mine as the mining operation progresses.

To overcome these and other difficulties, I provide conveying apparatus comprising an endless conveyor belt having a head pulley at one end and a tail pulley at the other end thereof around which the belt passes. The portion of the belt intermediate the head and tail pulleys is supported by a plurality of wheels mounted on the sides of the belt at intervals in position to engage a subjacent surface and support the belt without the necessity of providing idler supports. The belt is propelled by connecting the head pulley to a suitable source of power or by other suitable means.

Apparatus embodying features of my invention is illustrated in the accompanying drawings, forming a part of this application, in which:

Fig. 1 is a side elevational view, broken away, showing the discharge end of the conveyor;

Fig. 2 is a plan view of the discharge end of the conveyor, partly broken away and in section;

Fig. 3 is a side elevational view, broken away, showing the receiving end of the conveyor;

Fig. 4 is a plan view of the receiving end of the conveyor, partly broken away and in section;

Fig. 5 is an enlarged sectional view taken generally along the line V—V of Fig. 4;

Fig. 6 is an enlarged sectional view showing modified means for moving the axles to retracted position and means holding the axles in extended position while they form a part of the lower return flight of the conveyor belt;

Fig. 7 is an enlarged fragmental view taken generally along the line VII—VII of Fig. 6;

Fig. 8 is a diagrammatic plan view showing a modified form of conveyor;

Fig. 9 is a side elevational view, broken away, showing the support means for the discharge end of the conveyor shown in Fig. 8;

Fig. 10 is a plan view, partly broken away and in section, of the mechanism shown in Fig. 9;

Fig. 11 is a framental plan view showing the means for attaching the axles to the belt sections;

Fig. 12 is a sectional view taken generally along the line XII—XII of Fig. 11;

Fig. 13 is a sectional view taken generally along the line XIII—XIII of Fig. 11; and Fig. 14 is a fragmental sectional view taken generally along the line XIV—XIV of Fig. 11.

Referring now to the drawings for a better understanding of my invention, I show a continuous conveyor belt 10 which passes around a head pulley 11 at the discharge end of the conveyor and around a tail pulley 12 at the receiving end thereof. As shown in Figs. 1 and 2, the head pulley 11 is secured to a through shaft 13 which is mounted for rotation in bearings 14. A suitable frame-work 16 supports the bearings 14 as shown. Preferably, the supporting frame 16 is mounted on suitable rollers indicated at 15 whereby the frame may be moved from place to place. The supporting rollers are locked against rotation after the frame has been moved to the desired location to provide the necessary tension in the belt 10. If additional tension is required, the supporting rollers may be collapsed by any suitable means, not shown, or the supporting frame may be anchored by any suitable means. Mounted within the frame 16 is a motor 17 having a drive shaft 18. Mounted on the drive shaft 18 is a pulley 19 which is connected by a drive belt 21 to a pulley 22 mounted on the shaft 13.

The tail pulley 12 at the receiving end of the conveyor is secured to a through shaft 23 which is mounted for rotation in bearings 24. A suitable supporting frame 26 supports the bearings 24 in the manner shown. The supporting frame 26 is also mounted on supporting rollers 27 whereby the frame may be moved, when required. The supporting rollers are locked against rotation after the frame has been moved to the desired location to provide the necessary tension in the belt 10. If additional tension is required, the supporting rollers may be collapsed by any suitable means, not shown, or the supporting frame may be anchored by any suitable means.

The belt 10 intermediate the supporting frames 16 and 26 is supported by wheels 28 mounted on extensible axles 29 which are secured to the belt at longitudinally spaced intervals. Each of the extensible axles 29 comprises a tubular member 31 attached adjacent its outer end to one side of the belt 10 by means of a lost motion connector 32. Telescoping within the tubular member 31 is an elongated member 33 which is connected adjacent its outer end to the other side of the belt 10 by means of a lost motion connector 34. As clearly shown in Figs. 2 and 5, the outer ends of the members 31 and 33 are provided with short stub axle portions 36 and 37 upon which the wheels 28 are mounted for rotation. Positioned within the tubular member 31 between an abutment 38 and the inner end of the elongated member 33 is a compression spring 39 which urges the members 31 and 33 outwardly away from each other toward extended position.

The material to be conveyed, such as coal 41, is transferred to the receiving end of the conveyor 10 by means of a continuous type loader, a fragment of which is shown at 42. As this forms no part of my present invention, only a fragment of the loader is shown. As the coal falls onto the receiving end of the conveyor belt 10, the upper flight thereof sags, as shown in Fig. 5, thereby drawing the telescoping members 31 and 33 toward retracted position. With the axles 29 in retracted position, the wheels 28 associated with the upper flight of the conveyor belt ride on the upper surface of the lower flight. The lower flight of the belt 10, is supported by the wheels 28 which engage the subjacent surface 43, which may be the floor of a mine.

As the upper flight of the conveyor belt 10 approaches the pulley 11 at the discharge end, it is flattened out whereby it moves around the pulley. As the upper flight is flattened out, the telescoping sections 31 and 33 of the extensible axle are moved to extended position and are held in this position by means of the spring 39 until the lower or return flight of the belt 10 reaches the pulley 12 at the receiving end.

To assure that the upper flight of the belt 10 is flattened out as it approaches the head pulley 11 and to assure that the axles 29 move to extended position, I mount guide members 44 along the upper portion of the frame 16 in position to engage the inner surface of the wheels 28 as they approach the head pulley 11. The guide members 44 slope upwardly and flare outwardly toward the discharge end, as shown in Fig. 2, whereby the wheels 28 are moved outwardly away from each other toward extended position. Suitable channel-like guide members 46 are mounted at the bottom of the frame 16 in position to receive the wheels 28 as they pass beneath the head pulley 11. The material 41 thus conveyed is discharged into a suitable receptacle 47 as shown in Fig. 1.

Channel-like guide members 48 are mounted along the bottom of the supporting frame 26 in position to receive the wheels 28 as they approach the tail pulley 12, as shown in Figs. 3 and 4. Also, to assure that the wheels 28 move inwardly toward retracted position after they pass over the tail pulley 12, I provide guide members 49 in position to engage the outer surface of the wheels 28 and direct the same inwardly, as shown in Fig. 4. The guide members 49 may also be in the form of channel members.

In Figs. 6 and 7 I show a slightly modified form of mechanism which aids in moving the extensible axles toward retracted position after they pass around the pulley at the receiving end of the conveyer and means locking the axles in extended position after they pass around the head pulley at the discharge end of the conveyer. Mounted for pivotal movement intermediate its ends to opposite sides of the tubular member 31 is lever member 51 having inwardly converging sections 52 and 53 which terminate in an inwardly projecting detent 54. Suitable openings 56 and 57 are provided in the members 31 and 33, respectively, which are in alignment with each other when the sections are moved to extended position. A suitable counterweight 58 is mounted at the end of the lever member 51 opposite the detent 54 in position to urge the detent 54 into the openings 56 and 57 after the axles 29 move over the discharge or head pulley 11 to form a part of the lower flight of the conveyer. The axles 29 are thus held in extended position until the lower flight of the bolt passes around the tail pulley 12 at the receiving end, whereupon the counterweight 58 moves downwardly by gravity to remove the detent 54 from the opening 57. The axles 29 are then free to move toward retracted position in the manner described heretofore. To aid in moving the members 31 and 33 of the axles 29 toward retracted position, I connect the members 31 and 33 by a tension spring 59 which is positioned within the members 31 and 33, as shown in Fig. 6. The tension spring 59 urges the members 31 and 33 toward each other thereby causing the belt 10 to move to the curved position for receiving the material being conveyed.

Referring now to Figs. 8 to 14 of the drawings, I show a modified form of conveyer which is adapted to convey material around curves and in which the return flight of the conveyer travels in the same horizontal plane as the loaded flight. The conveyer comprises a belt 10a having a loaded or conveying flight 61 and a return flight 62. The belt passes over a head pulley 11a at the discharge end of the conveyer and passes over a tail pulley 12a at the receiving end thereof. The head pulley 11a is secured to a shaft 13a which is supported for rotation in bearings 14a carried by a suitable supporting frame 63. See Fig. 10. Preferably, the frame 63 is mounted on a continuous track 64. Mounted within the frame 63 is a motor 17a having a drive shaft 18a which carries a pulley 19a. Mounted on the shaft 13a for the head pulley 11a is a pulley 22a which is operatively connected to the pulley 19a by means of a drive belt 21a.

The tail pulley 12a is mounted on a suitable supporting frame 66 which is also preferably mounted on continuous tracks 67.

The conveyer belt 10a is divided into a plurality of belt sections which are pivotally connected to each other by means of vertical pins 68. Each pin 68 is secured to and extends inwardly of a transverse axle 69. Preferably, the axles 69 are of substantially inverted U-shape as viewed in front elevation with vertical leg portions 70 and 70a joined to outwardly directed stub axle portions 71 and 72, respectively, for receiving supporting wheels 28a. Adjacent sections of the belt 10a overlap each other, as shown in Figs. 11 and 12 with the pins 68 extending substantially through the middle thereof. Preferably, a grommet-like bearing number 73 connects the overlapped sections, as shown in Fig. 12 and receives the pin 68 with a sliding fit.

Secured to the undersurface of the axle 69 and surrounding the pin 68 is a plate 74. Mounted for rotation on the pin 68 beneath the plate 74 is a second plate 76 having upwardly and inwardly extending flanges 77 which engage the plate 74 whereby the plate 76 is connected rotatably thereto. Suitable ball bearings 78 are provided between the plates 74 and 76 to permit free rotation of the plates relative to each other. Secured to the lower plate 76 and extending substantially parallel to the axle 69 is a cross member 79. The sides of the outermost overlapped ends of the belt section are connected to the cross members 79 adjacent the outer ends thereof by means of lost motion connectors 81 and 82. Stop members 83 and 84 are provided at each end of the cross member 79 to limit lateral movement of the lost-motion connectors. The sides of the innermost overlapped ends of the belt sections are connected to lost motion connectors 86 and 87 which in turn are connected to other lost motion connectors 88 and 89, respectively. Suitable openings are provided in the connectors 88 and 89 for receiving the vertical leg portions 70 and 70a of the axles 69, as shown in Figs. 11 and 12. Preferably, the axles 69 are connected to elongated auxiliary members 91 and 92 by connecting members 93 and 94, respectively. The auxiliary members 91 and 92 are also preferably of inverted U-shape having the vertical leg portions 70 and 70a for receiving the lost motion connectors 88 and 89 which are connected to the lost-motion connectors 86 and 87, as shown in Fig. 11. The auxiliary members 91 and 92 extend substantially parallel to the axle members 69 and are spaced therefrom to prevent rotation of the axle 69 relative to the belt 10a.

Preferably, every other one of the overlapped ends of the belt section 10a are supported by a slightly modified form of axle 69a. The axle 69a is also of an inverted U-shape having vertical leg portions 70b and 70c.

The pin 68 is secured to the central portion of the axle 69a and projects inwardly thereof to support the overlapped ends of the belt, as shown in Fig. 13. The grommets 73 also surround the pins 68 and connect the overlapped ends of the belt sections. The innermost overlapped end of adjoining belt sections is connected at its sides to lost motion connectors 96 and 97 which in turn surround the axle 69a adjacent the ends thereof and inwardly of the vertical leg portions 70b and 70c. Suitable stop members 98 limit inward movement of the lost motion connectors relative to the axle 69a, as shown in Fig. 13. The outermost overlapped end of adjoining belt sections is thus supported above the innermost belt section as shown. Auxiliary members 91a and 92a are connected to the axle 69a by connecting members 93a and 94a as shown in Fig. 11. The innermost overlapped end of the belt section is also connected to the ends of the auxiliary members 91a and 92a by means of the lost motion connectors 96 and 97, as shown in Fig. 11.

An annular groove 99 is provided in the outer surface of each of the pulleys 11a and 12a for receiving the inwardly projecting pins 68, as shown in Fig. 10. As the belt 10a passes over the pulleys 11a and 12a, the overlapped belt sections move toward the bases of the U-shaped axle members 69 whereby they assume a substantially flat position relative to the pulleys. The lost motion connectors between the belt sections and the supporting axles permit the sides of the belt sections to move outwardly as the belt passes over the pulleys.

Guide members 101 are mounted on the supporting frame 63 in position to engage the wheels 28a of the conveyor belt and direct the return flights 62 laterally relative to the conveying flight 61, as shown in Figs. 8 and 10. Preferably, the guide members 101 are in the form of channel members having upturned flanges. In like manner, guide members 102 are mounted on the supporting frame 66 in position to engage the wheels 28a and direct the return flight laterally beneath the conveying flight as it approaches the tail pulley 12a.

In order to adapt the conveyor belt 10a to travel around curves, I mount curved guide members 103 beneath the conveying flight and guide members 104 beneath the return flight, as shown in Fig. 8, whereby the wheels 28a are guided around curves. After the wheels 28a have passed around the curves, one section of the conveyor belt follows the preceeding section thereby maintaining all sections in alignment until a guide member is reached.

The material to be conveyed, such as coal or the like, is loaded onto the conveying section 61 by means of a loader indicated diagrammatically at 106. The material is discharged as the belt 10a passes over the head pulley 11a onto a suitable receiving conveyor 107 which preferably transfers the material to a second conveyor 108 which extends substantially parallel to the direction of travel of the belt 10a over the head pulley 11a. By providing such a belt 108 adjacent the supporting frame 63, the entire conveying apparatus may be moved inwardly a distance corresponding to the length of the belt conveyor 108, the material being continuously discharged by the conveyor 107 onto the conveyor 108 as the supporting frame 63 and belt 10a are moved inwardly.

From the foregoing, it will be seen that I have devised improved conveying apparatus in which the lengths of the conveying belt may be readily lengthened or decreased with a minimum of effort and without the necessity of having to install or remove idlers. To vary the length of the belt all that is necessary is to add or remove belt sections. Also, by providing a conveyor belt which is supported by wheels carried by the belt, the conveying apparatus occupies a minimum of space and may be installed in a minimum of time. Also, by providing a conveyor in which the conveying flight travels on top of the return flight without the provision of idlers, a material saving in both labor and material is realized. Furthermore, by providing guide members which permit the belt conveyor to travel around curves, without interrupting the continuous operation of the conveyor, my apparatus is particularly adapted for use in coal mines and the like.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In conveying apparatus adapted to be supported by a relatively flat supporting surface, an endless conveyor belt comprising a plurality of belt sections with adjacent ends thereof overlapping each other, pulleys at the discharge and receiving ends of the conveyor belt around which the belt passes, vertical pins pivotally connecting said overlapping ends to each other, transverse axles secured adjacent their centers to said pins, lost motion connecting means between the sides of said belt sections and the adjacent ends of said axles, means limiting axial movement of said connecting means relative to said axles, wheels mounted for rotation on said axles in position to engage said supporting surface and support said belt intermediate said pulleys, means guiding the lower flight of said belt laterally of the upper flight after the belt has passed around the pulley at the discharge end, and means guiding the lower flight of the belt laterally beneath the upper flight as the lower flight approaches said receiving end of the conveyor.

2. Conveying apparatus as defined in claim 1 in which the pulleys at the discharge and receiving ends of the conveyor belt are provided with annular recesses in the outer surfaces thereof for receiving the inner ends of the vertical pins.

3. Conveying apparatus as defined in claim 1 in which the axles are of substantially inverted U-shape as viewed in front elevation with outwardly directed stub axle portions for receiving the wheels.

4. Conveying apparatus as defined in claim 3 in which at least some of the overlapped ends of the belt sections are connected to the axles by means comprising cross members mounted for pivotal movement about the vertical pins, means limiting vertical movement of the cross members relative to said pins, lost-motion connections between the sides of the outermost ones of said overlapped ends and the adjacent ends of said cross members, and lost-motion connections between the sides of the innermost ones of said overlapped ends and the adjacent leg portions of the U-shaped axles.

5. Conveying apparatus as defined in claim 3 in which the inverted U-shaped axles and the sides of the innermost ones of the overlapped ends are connected to auxiliary members which extend substantially parallel to and are spaced from said axles whereby rotation of said axles relative to the belt sections is limited.

References Cited in the file of this patent

UNITED STATES PATENTS

| Number | Name | Date |
| --- | --- | --- |
| 1,945,300 | West | Jan. 30, 1934 |
| 2,489,440 | Vallance | Nov. 29, 1949 |
| 2,747,726 | Robins | May 29, 1956 |
| 2,753,983 | Bloomer | July 10, 1956 |

FOREIGN PATENTS

| Number | Country | Date |
| --- | --- | --- |
| 294,399 | Great Britain | July 26, 1928 |
| 296,273 | Great Britain | Aug. 30, 1928 |
| 407,712 | Germany | Dec. 30, 1924 |
| 715,012 | Germany | Dec. 12, 1941 |